Patented Oct. 18, 1932

1,882,712

UNITED STATES PATENT OFFICE

LEONID ANDRUSSOW AND FELIX DUERR, OF MANNHEIM, GERMANY, ASSIGNORS TO I. G. FARBENINDUSTRIE AKTIENGESELLSCHAFT, OF FRANKFORT-ON-THE-MAIN, GERMANY

PRODUCTION OF CATALYSTS COMPRISING PHOSPHATES

No Drawing. Application filed February 28, 1931, Serial No. 519,248, and in Germany March 13, 1930.

The present invention relates to the production of catalysts comprising phosphates and has particular reference to catalysts employed for preparing organic compounds containing oxygen.

The object of the present invention is to impart a high activity and a long working life to catalysts comprising phosphates, in particular to those suitable for the production of organic compounds containing oxygen, as for example formaldehyde.

We have found that catalysts comprising phosphates of excellent activity, high porosity and great stability to heat are obtained by dissolving substances comprising metals, the phosphates of which are insoluble in water but soluble in concentrated phosphoric acid, in an excess of concentrated phosphoric acid, for example from twice to ten times the amount thereof by weight with regard to the amount of catalyst, more especially, a phosphoric acid of about 89 to 100 per cent strength, preferably while heating, for example to a temperature of about 150° C. or more and precipitating the highly complex metal phosphates thus obtained by passing the solution obtained into a large excess of water. The flocculent precipitate is filtered off by suction, preferably after decanting it once or several times, and then washed and dried. Metals the phosphates of which dissolve in concentrated phosphoric acid are for example cerium, thorium, bismuth, uranium, aluminium, cadmium and iron. The said metals may be employed in the form of elements, preferably in a finely pulverized state, or in a combined form, for example in the form of their oxides or hydroxides or salts capable of dissolving in phosphoric acid, such as nitrates, carbonates, chlorides, acetates, or other compounds. The phosphates thus obtained may be activated by the addition of other metals or compounds thereof, the phosphates of which, as for example calcium phosphate, must not be soluble in concentrated phosphoric acid. These additional substances may be mixed with the aforesaid substances before being treated with phosphoric acid, or before the precipitation of the phosphates dissolved in phosphoric acid with water. As additional substances may be mentioned the metals antimony, chromium, cobalt, copper, magnesium, manganese, nickel, silver, tungsten, zinc and tin or the compounds thereof, for example the oxides or phosphates.

For carrying out the precipitation of the dissolved complex phosphates, the phosphoric acid solution is poured into more than about twice, preferably between five times and ten times, its volume of water. The water need not necessarily be pure, but may also contain in solution acids, alkalies or salts. Thus for example dilute phosphoric acid obtained in a preceding stage of working or washing water, may be employed with an equally good result.

The catalysts obtained according to the present invention are particularly suitable for the preparation of organic compounds containing oxygen, such as by the interaction of organic compounds, in particular saturated and unsaturated hydrocarbons, with oxygen or steam, as for example the production of formaldehyde and acetaldehyde from ethylene and oxygen or of ethyl alcohol from ethylene and water.

Phosphate catalysts which have become inactive may readily be regenerated according to this invention by using them as initial materials.

The following examples will further illustrate the nature of this invention, but the invention is not restricted to these examples. The parts are by weight.

Example 1

2 parts of uranium oxide and 1 part of bismuth chloride are dissolved in 10 parts of 89 per cent phosphoric acid at 160° C.; the solution, after cooling, being poured into 75 parts of water. The phosphate separates in a flocculent form. The whole is decanted several times, the precipitate filtered by suction, washed and dried at 120° C. The phosphate thus obtained may be employed with advantage for example for the manufacture of acetaldehyde from acetylene by converting the latter for example with 10 times its volume of steam at from 350° to 450° C. The catalyst is far superior to phosphate catalysts prepared by other methods as regards the period of time during which it may be employed.

Example 2

1 part cerium dioxide ($CeO_2$) is dissolved in 6 parts of phosphoric acid (100 per cent) at 150° C. The liquid, after cooling, is mixed with 1 part of tin tetrachloride, the whole heated and after cooling again poured into 60 parts of water and treated as described in Example 1.

With an hourly throughput of 50 litres of methane and 50 litres of air at 720° C. while employing 100 cubic centimetres of said catalyst, a yield of 5 per cent by weight of formaldehyde (with reference to the methane employed) is obtained. Somewhat better yields are obtained with a catalyst the precipitation and washing of which have been carried out with N/2 hydrochloric acid. Cerium, cerium-bismuth or cerium-tin phosphates obtained according to other methods, as for example by precipitation with secondary sodium phosphate, yield only a few thousandths of one per cent of formaldehyde. If with the same catalyst ethylene is treated instead of methane at a temperature of about 450° C. in the presence of air, formaldehyde containing small amounts of acetaldehyde is obtained in an excellent yield.

Bismuth chloride or oxide may be employed for the preparation of the catalyst instead of the said tin tetrachloride.

Example 3

The nitrates of cadmium, iron, aluminium and thorium are dissolved in the ratio by weight of 3:2:2:5 in 40 parts of 89 per cent phosphoric acid at 170° C. When the evolution of nitrous gases ceases the solution is allowed to cool and then poured into 400 parts of water. The flocculent product is treated as described in Example 1. The catalyst thus obtained, in common with those obtained in Examples 1 and 2, has a high stability to heat; it may be heated for long periods of time at above 850° C. without losing its highly porous structure. When employed for the oxidation of methane or ethylene to formaldehyde no diminution of its activity after the heat treatment can be detected.

Example 4

A cerium-bismuth phosphate catalyst prepared according to Example 2, the activity of which has subsided by reason of use for several months, is ground, and for the purpose of regeneration dissolved in twice its weight of 89 per cent phosphoric acid and precipitated in 30 parts of water. The precipitate is further treated as described in Example 1. After this treatment the catalyst recovers its original activity in the process described in Example 2.

What we claim is:—

1. A process for the preparation of a catalyst suitable for the production of an organic compound containing oxygen, which comprises dissolving a substance comprising a metal the phosphate of which is insoluble in water and soluble in concentrated phosphoric acid, in an excess of concentrated phosphoric acid and mixing the solution of said substance in phosphoric acid thus obtained with a large excess of water.

2. A process for the preparation of a catalyst suitable for the production of organic compounds containing oxygen, which comprises dissolving, while heating, a substance comprising a metal the phosphate of which is insoluble in water and soluble in concentrated phosphoric acid, in an excess of concentrated phosphoric acid and mixing the solution of said substance in phosphoric acid thus obtained with a large excess of water.

3. A process for the preparation of a catalyst suitable for the production of organic compounds containing oxygen, which comprises dissolving, while heating, a substance comprising a metal the phosphate of which is insoluble in water and soluble in concentrated phosphoric acid, in an excess of concentrated phosphoric acid, mixing the solution of said substance in phosphoric acid thus obtained with a large excess of water, a precipitate thus being formed, decanting said precipitate at least once, filtering it off by suction, washing and drying it.

4. A process for the production of a catalyst suitable for the production of organic compounds containing oxygen, which comprises dissolving a substance comprising a metal selected from the group consisting of cerium, thorium, bismuth, uranium, aluminium, cadmium and iron in an excess of concentrated phosphoric acid and mixing the solution of said substance in phosphoric acid thus obtained with a large excess of water.

5. A process for the preparation of a catalyst suitable for the production of organic compounds containing oxygen, which comprises treating with an excess of concentrated phosphoric acid a finely divided mixture of a substance comprising a metal the phosphate of which is insoluble in water and soluble in concentrated phosphoric acid, with another substance comprising a metal the phosphate of which is insoluble in concentrated phosphoric acid, a suspension of the second substance in the solution of the first substance thus being obtained and mixing the said suspension with a large excess of water.

In testimony whereof we have hereunto set our hands.

LEONID ANDRUSSOW.
FELIX DUERR.